June 24, 1930.   J. A. OST   1,766,450
BUN CUTTING MACHINE
Filed March 14, 1928   2 Sheets-Sheet 1
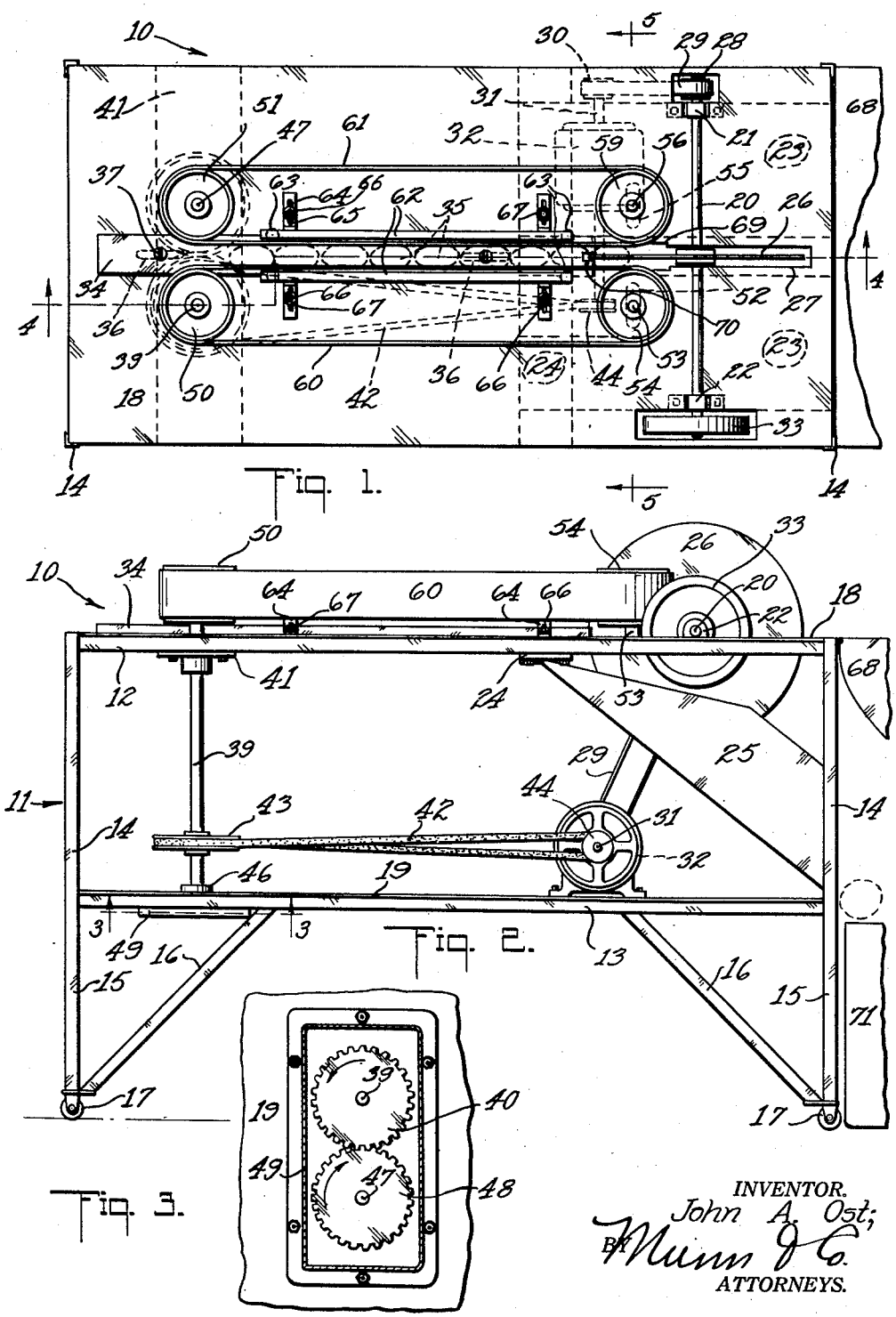
INVENTOR.
John A. Ost;
BY Munn & Co.
ATTORNEYS.

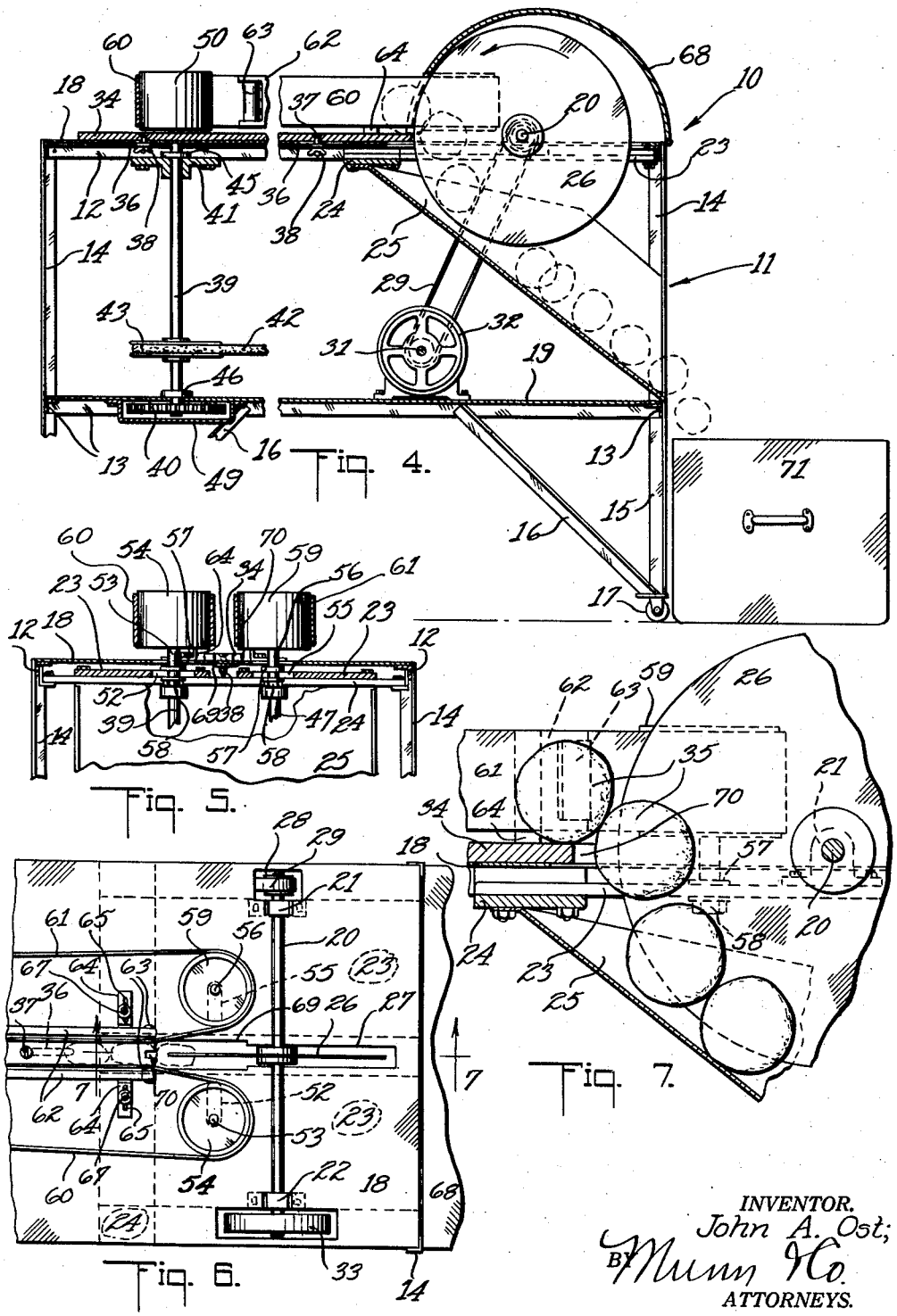

Patented June 24, 1930

1,766,450

UNITED STATES PATENT OFFICE

JOHN A. OST, OF LOS ANGELES, CALIFORNIA

BUN-CUTTING MACHINE

Application filed March 14, 1928. Serial No. 261,647.

My invention relates to machines for cutting buns and other bakery or food products, and it refers particularly to a machine of this character in which a rotary cutter or knife is employed for performing the cutting operation.

One object of my invention is to mount the cutter or knife in a machine of this character in a suitable frame structure so that the knife is rotatable in a substantially vertical plane, and to provide means for supporting the buns or other food products during their travel toward the knife, and also to arrange means by which the products are frictionally carried over the supporting means toward the knife in order to effect the cutting quickly and efficiently and without marring the food products so as to make them objectionable in appearance.

Another object of my invention is to construct a machine of this character so that the supporting means for the food products during their travel toward the knife is in the form of a track member, which is detachably secured to the frame structure of the machine and is adapted to be shifted longitudinally to selected positions away from the knife or in proximity thereto. By this construction, the machine is adapted to be used, not only for completely severing rolls or buns, but is also adapted to be used for cutting only partly through food products, consisting of rolls adapted to receive between the separated portions thereof such other food products as slices of meat, sausages or the like, or for cutting partly through food products consisting of some kind of sausages, such, for instance, as are popularly termed "hot dogs," which after their partial severing are further prepared in various ways for serving to customers.

A further object of my invention is to construct a machine of this character with the aforementioned track member and means for frictionally carrying the food products toward the knife and to arrange the carrying means so that they may be adjusted to different positions laterally of the knife and thereby may co-operate with the track member for effecting in a most satisfactory manner a complete severing, or only a partial severing, of the food products, according to the desire of the operator.

A still further object of my invention is to provide a machine of this character, in addition to the aforementioned supporting and carrying means for the food products, with adjustable guide members on the sides of the supporting means in order to guide the food products before they reach the knife, so that the latter may cut the food uniformly in a selected plane.

With the above mentioned objects and with other objects in view, the invention consists in the novel construction and combination of parts hereinafter described, illustrated in the accompanying drawings, and set forth in the appended claims, it being understood that various changes in the form, proportion, size and minor details of construction within the scope of the claims may be resorted to without departing from the spirit, or without sacrificing any of the advantages, of the invention.

In the drawings,

Figure 1 is a plan of the preferred embodiment of a cutting machine constructed according to the principles of my invention, the guard for the rotary knife of the machine being broken and shown in its open position, and buns being indicated by dotted lines as carried to the knife;

Figure 2 is a side elevation of the machine shown in Figure 1, the guard for the rotary knife being broken and shown in its open position, and one of the buns, cut by the knife, being indicated by dotted lines as having emerged from the discharge chute and being in a position for dropping into a receptacle, which is represented by a broken view as placed at the discharge end of the machine;

Figure 3 is a section taken in a plane indicated by the line 3—3 in Figure 2, and shows the main shafts for each pair of pulleys that carry the endless belts thereon, the view also showing the gear connection between the shafts, the housing for the gears, and a portion of the plate to which the gear housing is secured;

Figure 4 is a broken and sectional view of the machine, the view being taken in planes indicated by the lines 4—4 in Figure 1 and showing the knife guard in its closed position over the rotary knife and also showing the track member adjusted to such a position that the knife, rotating in the direction indicated by the curved arrow, is adapted to cut entirely through buns, which are indicated by dotted lines as carried to the knife and, after being cut, as rolling down the discharge chute into a receptacle at the discharge end of the machine;

Figure 5 is a broken and sectional view taken in a plane indicated by the line 5—5 in Figure 1;

Figure 6 is a broken plan of the end portion of the machine in which the rotary knife is mounted, the view showing the knife guard in its open position, the track member adjusted to a position at such a distance from the knife that the latter can only partly sever buns, which are indicated by dotted lines as carried over the track member to the knife, and also showing the pulleys at the sides of the knife as shifted to their extreme positions away from the knife so as to pull the endless belts away from contact with the bun that is being cut; and Figure 7 is a broken, enlarged section, taken in a plane indicated by the line 7—7 in Figure 6, and shows how buns are carried over the track member to the knife and how the buns, after being partly severed by the knife, roll downward into the discharge chute.

A preferred form of the cutting machine of my invention is in the drawings indicated in a general way by the numeral 10. This machine comprises a structure 11, which may include upper horizontal angle pieces 12, joined at their ends so as to form a substantially rectangular frame, and lower horizontal angle pieces 13, also joined at their ends so as to form another substantially rectangular frame, and these frames are in their turn joined at their corners by vertical angle pieces 14. The latter extend below the lower frame so as to form legs 15, and oblique angle pieces 16 respectively join the lower ends of the legs to the horizontal angle pieces 13 in order to assure rigidity of the structure, while the lower ends of the legs may be provided with casters 17 in order to enable a person to move the machine 10 readily from one place to another.

On top of the upper frame comprising the horizontal angle pieces 12 is suitably secured a plate 18, and another plate 19 is similarly secured on top of the lower frame comprising the horizontal angle pieces 13. A shaft 20 extends transversely of the frame structure 11 and not far from the discharge end of the machine and preferably above the plate 18. This shaft is journaled between its ends in bearings 21 and 22, which extend through openings in the plate 18 and may be respectively secured upon longitudinal shelves 23, spaced from each other below the plate, each of the shelves in turn having one end suitably secured at the discharge end of the machine to the respective end piece 12 in the frame structure 11, while the other end of each shelf 23 is preferably secured upon a beam 24, which is transverse to the frame structure and is at its ends secured to the respective angle pieces 12 at the sides of the frame structure. To the beam 24 is also secured the upper end of a suitably formed discharge chute 25, which leads obliquely from the beam down toward the end piece 13 below the end piece 12, to which the shelves 23 are secured, and between the respective vertical angle pieces 14 at the end of the plate 19.

A knife 26, preferably consisting of a thin disk, is suitably secured upon the shaft 20 at an intermediate portion of the shaft so as to extend between the shelves 23, and the plate 18 is formed with an opening 27, sufficiently wide for accommodating the knife and the securing collars therefor so as to assure a free running of the knife, the edge of which may be serrated or smooth, like the edge of a razor, according to the special use of the machine. As shown in Figures 1 and 6, the shaft 20 may have secured thereon outside of the bearing 21 a pulley 28, a suitable opening being provided in the plate 18 for accommodating the pulley and a belt 29 trained thereover and over a drive pulley 30 on the shaft 31 of the motor 32, which is mounted on the plate 19 and derives its power from any suitable source in order to transmit a rotary motion to the knife 26 in the direction indicated by the curved arrow in Figure 4. Outside of the bearing 22, the shaft 20 has preferably thereon a flywheel 33, for the accommodation of which an opening is also provided in the plate 18.

Upon the plate 18 is an elongated track member 34, which serves as a means for supporting buns 35 or other food products thereon while they are carried to the knife 26. This track member is so arranged that it can be quickly shifted longitudinally to or from the knife and that it can be locked in any of the positions to which it may have been shifted, and also so that it can be easily attached to or detached from the plate 18. Of course, the adjustment of the track member to its different positions may be accomplished by various means, but I prefer for this purpose to provide the plate 18 with two elongated openings 36, which are alined with each other and are in the same plane as the knife 26 and are adapted to receive slidably therein the respective stems of screws 37, extending through suitably formed openings in the track member and preferably having flat heads so as not to protrude above the top surface of the track member and thereby not to be causes of obstruction for the buns or other food products that are carried over the track member toward the knife. Wing nuts 38, screwed upon the screws 37 against the underside of the plate, complete the means for quickly locking the track member in its required position.

The track member 34 has on one side thereof towards the receiving end of the machine 10 a substantially vertical shaft 39, which near its lower end is rotatably journaled in the plate 19 and below the plate has fixed thereon a gear wheel 40, the shaft extending rotatably through the upper plate 18 and preferably being journaled in a beam 41, which is suitably secured transversely of the frame structure 11 to the side pieces 12 below the plate 18. By means of a belt 42, trained over a driven pulley 43 on the shaft 39 and over a drive pulley 44 on the motor shaft 31, a rotary motion is imparted from the motor 32 to the shaft 39, collars 45 and 46 being respectively secured upon the latter shaft above the beam 41 and the plate 19 in order to retain the shaft in its proper endwise position in the frame structure 11. Another substantially vertical shaft 47, similar to the shaft 39 and similarly mounted in the beam 41 and the plate 19, has fixed thereon below the latter plate a gear wheel 48, which meshes with the gear wheel 40, so that, when the shaft 39 is rotated in one direction, the shaft 47 is caused to rotate in the opposite direction. Both of these gear wheels are enclosed in a suitable housing 49, removably secured to the plate 19.

Pulleys 50 and 51 are respectively fixed on the upper extensions of the shafts 39 and 47, and in the shelf 23, on which the bearing 22 is secured, is formed an elongated opening 52, which extends transversely of the shelf and is adapted to receive slidably therein the lower end of a shaft 53, and this shaft extends through a clearance opening in the plate 18 above the latter in correspondence with the shafts 39 and 47 and has rotatably mounted on its upper extension a pulley 54, similar to the pulleys 50 and 51. The shelf 23, which has secured thereon the bearing 21, is provided with an elongated opening 55, similar to the opening 52 in the other shelf 23 and alined therewith and adapted to receive slidably therein the lower end of a shaft 56, which is similar to the shaft 53 and similarly extends through a clearance opening in the plate 18. Each of the shafts 53 and 56 is preferably provided with a flange portion 57 above the respective shelf 23 and has at its lower end threaded thereon a nut 58, so that, by the tightening of the nuts against the shelves, the shafts are adjustably secured to the shelves. Upon the upper extension of the shaft 56 is rotatably mounted a pulley 59, similar to the pulley 54 on the shaft 53, and over the pair of pulleys 50 and 54 is trained an endless belt 60, while over the pair of pulleys 51 and 59 is trained another endless belt 61.

Guide members 62 are arranged on both sides of the track member 34 so as to extend respectively between the pairs of pulleys 50, 54, and 51, 59, and inside of the respective belts 60 and 61, but not at the side of the knife 26. Each of the guide members is preferably provided with anti-friction rollers 63 at its ends and is adjustably secured to the plate 18 by any suitable means. For instance, the guide member may be secured near the rollers 63 to respective angle pieces 64, and the base arm of each angle piece may have an elongated slot 65 therein so that the angle pieces can be slidably fitted on respective studs 66, secured in the plate 18, while nuts 67 threaded upon the studs serve to tighten the angle pieces upon the plate. By this arrangement, the guide members can be shifted toward or away from the track member, so that the tension of the belts 60 and 61 may thereby be properly adjusted. The guide members can thereby also be set so as to guide the buns or other food products between the belts in order that such food products may be cut by the knife 26 in any selected plane.

The machine 10 is preferably provided with a guard 68. This guard may be hinged at the discharge end of the machine so that it can be swung outward to a fully open position, as shown in Figures 1, 2 and 6, and that thereby the knife 26, the shaft 20 and the bearings 21 and 22 therefor are easily accessible, or that the guard can be swung to a closed position over the knife, as shown in Figure 4, thus fully protecting a person from being cut by the knife.

When it is desired to cut food products, such as the buns 35, the guard 68 is swung to its closed position, the guard having therein a slot wide enough for allowing the buns to pass therethrough and under the guard. The motor 32 is then started, thereby causing the knife to revolve in the direction indicated by the curved arrow in Figure 4 and thereby simultaneously causing the belts 60 and 61 to move so that the buns placed edgewise on the track member 34 are frictionally carried by the belts toward the knife, the opening 27 in the plate 18 being at the discharge end of the track member of a width adapted to allow the buns to pass freely therethrough, as shown at 69 in Figures 1, 5 and 6. Preferably, the track member has in its discharge end a slot 70, which is adapted to receive the edge of the knife therein, so that the track member can be adjusted to a position in which the periphery of the knife extends into the track member, as shown in Figures 1 and 4, and that thus the buns emerging from the track member necessarily must be cut entirely through by the knife. The buns that have been cut are then dropped through the opening at 69 in the plate 18 into the discharge chute 25, from which they gravitate into a suitable receptacle 71 placed at the discharge end of the machine, as shown in Figures 2 and 4. From the receptacle the buns may thereafter be transferred to an oven in order to be toasted.

Again, when it is desired to cut only partly through the food products, the track member is adjusted so that its discharge end is spaced from the periphery of the knife, as shown in Figures 6 and 7, the distance of the track member from the knife depending upon how deep a cut is required into the food products. The pulleys 54 and 59 are at the same time adjusted to such positions away from the knife that—whether rolls or buns, as shown in these figures, or any other food products, such as sausages of various kinds, are carried between the belts 60 and 61 and over the track member toward the knife—the belts are pulled away from the knife and thereby release their frictional hold upon the bun or other food product that is being cut, thus positively preventing its being fed farther than to the discharge end of the track member and thereby also avoiding its complete severing by the knife. Of course, after having reached the discharge end of the track member, the bun, if it has any tendency to adhere to the knife, is caused, owing to the rotative direction of the latter, to be thrown by the centrifugal force down into the chute 25, from which it will gravitate to the discharge end of the machine and into the receptacle therefor.

From the foregoing, it is clear that the machine 10 of my invention is capable of an extremely rapid operation and that it otherwise has decided advantages over machines of this character heretofore known. It should be noted, of course, that in defining the invention in the appended claims I use the word "buns" in such a broad sense as to include all kinds of food products that can be cut in the machine.

I claim as my invention:

1. A machine for cutting buns, or the like, the machine comprising a frame structure; a knife rotatably mounted in the structure; means associated with the structure in order to support the buns during their travel toward the knife; means for adjustably securing the bun-supporting means to the structure so that the supporting means may be shifted edgewise of the knife to selected positions away from the knife or in proximity thereto; means for frictionally carrying the buns toward the knife; means for adjusting the carrying means laterally of the knife so as to maintain or to release the frictional holding of the carrying means upon the buns, when the latter have been carried to the discharge end of the bun-supporting means, and thereby to co-operate with the bun-supporting means in order to effect a complete, or only a partial, severing of the buns; and means for rotating the knife and for simultaneously operating the bun-carrying means.

2. A machine for cutting buns, or the like, the machine comprising a frame structure; a knife rotatably mounted in the structure; stationary means associated with the structure in order to support the buns during their travel toward the knife; a pair of pulleys rotatably mounted on each side of the bun-supporting means, one pulley in each pair being at the side of the knife; endless belts respectively trained over the pairs of pulleys, the pairs of pulleys being sufficiently spaced from each other for allowing the buns to be frictionally held between the opposing faces of the belts; means for adjustably securing the pulleys at the sides of the knife so as to cause the belts to maintain or to release their frictional hold upon the buns during the cutting of the latter; and means for rotating the knife and for simultaneously rotating the pulleys.

3. A machine for cutting buns, or the like, the machine comprising a frame structure; a knife rotatably mounted in the structure; a track member detachably secured to the structure and adapted to support the buns during their travel toward the knife; a pair of pulleys rotatably mounted on each side of the track member, one pulley in each pair being at the side of the knife; endless belts respectively trained over the pairs of pulleys, the pairs of pulleys being sufficiently spaced from each other for allowing the buns to be frictionally held between the opposing faces of the belts; means for adjustably securing the pulleys at the sides of the knife so as to cause the belts to maintain or to release their frictional hold upon the buns during the cutting of the latter; and means for rotating the knife and for simultaneously rotating the pulleys.

4. A machine for cutting buns, or the like, the machine comprising a frame structure; a knife rotatably mounted in the structure; a track member adapted to support the buns during their travel toward the knife; means for adjustably securing the track member to the structure so that the track member may be shifted longitudinally to selected positions away from the knife or in proximity thereto; a pair of pulleys rotatably mounted on each side of the track member, one pulley in each pair being at the side of the knife; endless belts respectively trained over the pairs of pulleys, the pairs of pulleys being sufficiently spaced from each other for allowing the buns to be frictionally held between the opposing faces of the belts; means for adjustably securing the pulleys at the sides of the knife so as to cause the belts to maintain or to release their frictional hold upon the buns during the cutting of the latter and thereby to cooperate with the track member in order to effect a complete, or only a partial, severing of the buns; and means for rotating the knife and for simultaneously rotating the pulleys.

5. A machine for cutting buns, or the like, the machine comprising a frame structure; a knife rotatably mounted in the structure; stationary means associated with the structure in order to support the buns during their travel toward the knife; a pair of pulleys rotatably mounted on each side of the bun-supporting means, one pulley in each pair being at the side of the knife; endless belts respectively trained over the pairs of pulleys, the pairs of pulleys being sufficiently spaced from each other for allowing the buns to be frictionally held between the opposing faces of the belts; guide members adjustably secured on the sides of the bun-supporting means, each guide member extending between the pulleys in the respective pair but not at the side of the knife in order that the guide members may be adapted to guide the belts and thereby to guide the buns to the knife so that the latter may cut the buns uniformly in a selected plane; means for adjustably securing the pulleys at the sides of the knife so as to cause the belts to maintain or to release their frictional hold upon the buns during the cutting of the latter; and means for rotating the knife and for simultaneously rotating the pulleys.

JOHN A. OST.